United States Patent
Wong et al.

(10) Patent No.: US 8,655,588 B2
(45) Date of Patent: Feb. 18, 2014

(54) METHOD AND APPARATUS FOR PROVIDING ACCURATE LOCALIZATION FOR AN INDUSTRIAL VEHICLE

(75) Inventors: Lisa Wong, Auckland (NZ); Andrew Evan Graham, Waitakere (NZ); Christopher W. Goode, Auckland (NZ)

(73) Assignee: Crown Equipment Limited, Auckland (NZ)

( * ) Notice: Subject to any disclaimer, the term of this patent is extended or adjusted under 35 U.S.C. 154(b) by 244 days.

(21) Appl. No.: 13/300,041

(22) Filed: Nov. 18, 2011

(65) Prior Publication Data

US 2012/0303176 A1  Nov. 29, 2012

Related U.S. Application Data

(63) Continuation-in-part of application No. 13/116,600, filed on May 26, 2011, now abandoned.

(51) Int. Cl.
*G01C 21/10* (2006.01)
(52) U.S. Cl.
USPC ............................................................ 701/500
(58) Field of Classification Search
CPC .................................................... G01S 17/023
USPC ............................................................ 701/500
See application file for complete search history.

(56) References Cited

U.S. PATENT DOCUMENTS

| | | |
|---|---|---|
| 4,043,418 A | 8/1977 | Blakeslee |
| 4,782,920 A | 11/1988 | Gaibler et al. |
| 4,855,915 A | 8/1989 | Dallaire |
| 4,858,132 A | 8/1989 | Holmquist |
| 5,011,358 A | 4/1991 | Andersen et al. |
| 5,051,906 A | 9/1991 | Evans, Jr. et al. |
| 5,170,352 A | 12/1992 | McTamaney et al. |
| 5,202,832 A | 4/1993 | Lisy |
| 5,208,753 A | 5/1993 | Acuff |
| 5,471,393 A | 11/1995 | Bolger |
| 5,491,670 A | 2/1996 | Weber |
| 5,539,638 A | 7/1996 | Keeler et al. |

(Continued)

FOREIGN PATENT DOCUMENTS

| | | |
|---|---|---|
| DE | 19757333 C1 | 9/1999 |
| DE | 10220936 A1 | 12/2003 |

(Continued)

OTHER PUBLICATIONS

Office Action from U.S. Appl. No. 12/948,358 mailed Apr. 8, 2013.

(Continued)

*Primary Examiner* — Mary Cheung
*Assistant Examiner* — Anne Mazzara
(74) *Attorney, Agent, or Firm* — Dinsmore & Shohl LLP

(57) ABSTRACT

A method and apparatus for providing accurate localization for an industrial vehicle is described; including processing at least one sensor input message from a plurality of sensor devices, wherein the at least one sensor input message includes information regarding observed environmental features; determining position measurements associated with the industrial vehicle in response to at least one sensor input message, wherein the plurality of sensor devices comprises a two-dimensional laser scanner, and at least one other sensor device selected from an odometer, an ultrasonic sensor, a compass, an accelerometer, a gyroscope, an inertial measurement unit, or an imaging sensor; and updating a vehicle state using the position measurements.

17 Claims, 13 Drawing Sheets

(56) References Cited

U.S. PATENT DOCUMENTS

| | | | |
|---|---|---|---|
| 5,568,030 A | 10/1996 | Nishikawa et al. | |
| 5,612,883 A | 3/1997 | Shaffer et al. | |
| 5,646,845 A | 7/1997 | Gudat et al. | |
| 5,682,317 A | 10/1997 | Keeler et al. | |
| 5,916,285 A | 6/1999 | Alofs et al. | |
| 5,961,571 A | 10/1999 | Gorr et al. | |
| 6,012,003 A | 1/2000 | Astrom | |
| 6,092,010 A | 7/2000 | Alofs et al. | |
| 6,208,916 B1 | 3/2001 | Hori | |
| 6,246,930 B1 | 6/2001 | Hori | |
| 6,308,118 B1 | 10/2001 | Holmquist | |
| 6,325,749 B1 | 12/2001 | Inokuchi et al. | |
| 6,461,355 B2 | 10/2002 | Svejkovsky et al. | |
| 6,539,294 B1 | 3/2003 | Kageyama | |
| 6,592,488 B2 | 7/2003 | Gassmann | |
| 6,842,692 B2 | 1/2005 | Fehr et al. | |
| 6,917,839 B2 | 7/2005 | Bickford | |
| 6,934,615 B2 | 8/2005 | Flann et al. | |
| 6,952,488 B2 | 10/2005 | Kelly et al. | |
| 7,148,458 B2 | 12/2006 | Schell et al. | |
| 7,162,056 B2 | 1/2007 | Burl et al. | |
| 7,162,338 B2 | 1/2007 | Goncalves et al. | |
| 7,177,737 B2 | 2/2007 | Karlsson et al. | |
| 7,272,467 B2 | 9/2007 | Goncalves et al. | |
| 7,343,232 B2 | 3/2008 | Duggan et al. | |
| 7,386,163 B2 | 6/2008 | Sabe et al. | |
| 7,451,030 B2 | 11/2008 | Eglington et al. | |
| 7,539,563 B2 | 5/2009 | Yang et al. | |
| 7,610,123 B2 | 10/2009 | Han et al. | |
| 7,646,336 B2 | 1/2010 | Tan et al. | |
| 7,650,231 B2 | 1/2010 | Gadler | |
| 7,679,532 B2 | 3/2010 | Karlsson et al. | |
| 7,688,225 B1 | 3/2010 | Haynes et al. | |
| 7,689,321 B2 | 3/2010 | Karlsson | |
| 7,720,554 B2 | 5/2010 | DiBernardo et al. | |
| 7,734,385 B2 | 6/2010 | Yang et al. | |
| 7,739,006 B2 | 6/2010 | Gillula | |
| 7,844,364 B2 | 11/2010 | McLurkin et al. | |
| 7,996,097 B2 | 8/2011 | DiBernardo et al. | |
| 8,020,657 B2 | 9/2011 | Allard et al. | |
| 8,050,863 B2 | 11/2011 | Trepangnier et al. | |
| 8,103,383 B2 | 1/2012 | Nakamura | |
| 8,126,642 B2 | 2/2012 | Trepagnier et al. | |
| 8,150,650 B2 | 4/2012 | Goncalves et al. | |
| 8,204,679 B2 | 6/2012 | Nakamura | |
| 8,255,107 B2 | 8/2012 | Yang et al. | |
| 8,280,623 B2 | 10/2012 | Trepagnier et al. | |
| 2002/0049530 A1 | 4/2002 | Poropat | |
| 2004/0030493 A1 | 2/2004 | Pechatnikov et al. | |
| 2004/0202351 A1 | 10/2004 | Park et al. | |
| 2004/0249504 A1 | 12/2004 | Gutmann et al. | |
| 2005/0149256 A1 | 7/2005 | Lawitzky et al. | |
| 2005/0182518 A1 | 8/2005 | Karlsson | |
| 2005/0244259 A1 | 11/2005 | Chilson et al. | |
| 2006/0181391 A1 | 8/2006 | McNeill et al. | |
| 2006/0184013 A1 | 8/2006 | Emanuel et al. | |
| 2007/0061043 A1 | 3/2007 | Ermakov et al. | |
| 2007/0090973 A1 | 4/2007 | Karlsson et al. | |
| 2007/0106465 A1 | 5/2007 | Adam et al. | |
| 2007/0150097 A1 | 6/2007 | Chae et al. | |
| 2007/0153802 A1 | 7/2007 | Anke et al. | |
| 2007/0244640 A1* | 10/2007 | Hirokawa | 701/213 |
| 2007/0262884 A1 | 11/2007 | Goncalves et al. | |
| 2009/0005986 A1 | 1/2009 | Soehren | |
| 2009/0140887 A1 | 6/2009 | Breed et al. | |
| 2009/0216438 A1 | 8/2009 | Shafer | |
| 2010/0161224 A1 | 6/2010 | Lee et al. | |
| 2010/0222925 A1* | 9/2010 | Anezaki | 700/253 |
| 2010/0256908 A1 | 10/2010 | Shimshoni et al. | |
| 2010/0268697 A1 | 10/2010 | Karlsson et al. | |
| 2011/0010023 A1 | 1/2011 | Kunzig et al. | |
| 2011/0121068 A1 | 5/2011 | Emanuel et al. | |
| 2011/0125323 A1 | 5/2011 | Gutmann et al. | |
| 2011/0150348 A1 | 6/2011 | Anderson | |
| 2011/0153338 A1 | 6/2011 | Anderson | |
| 2011/0216185 A1 | 9/2011 | Laws et al. | |
| 2011/0218670 A1 | 9/2011 | Bell et al. | |
| 2011/0230207 A1 | 9/2011 | Hasegawa | |
| 2012/0035797 A1 | 2/2012 | Oobayashi et al. | |
| 2012/0101784 A1 | 4/2012 | Lindores et al. | |
| 2012/0191272 A1 | 7/2012 | Andersen et al. | |
| 2012/0323431 A1 | 12/2012 | Wong et al. | |
| 2013/0006420 A1 | 1/2013 | Karlsson et al. | |

FOREIGN PATENT DOCUMENTS

| | | |
|---|---|---|
| DE | 10234730 A1 | 2/2004 |
| DE | 102007021693 A1 | 11/2008 |
| EP | 1 201 536 A2 | 5/2002 |
| EP | 1732247 A1 | 12/2006 |
| EP | 1 995 206 A1 | 11/2008 |
| GB | 2389947 A | 12/2003 |
| JP | 52-066260 | 1/1977 |
| JP | 60067818 A | 4/1985 |
| JP | 2002048579 A | 2/2002 |
| JP | 2002108446 A | 4/2002 |
| JP | 2005114546 A | 4/2005 |
| WO | 03096052 A2 | 11/2003 |

OTHER PUBLICATIONS

Office Action pertaining to U.S. Appl. No. 13/159,500, dated Mar. 26, 2013.

Office Action pertaining to U.S. Appl. No. 13/219,271, dated Feb. 25, 2013.

Office Action pertaining to U.S. Appl. No. 13/153,743, dated Mar. 4, 2013.

International Search Report and Written Opinion pertaining to International Patent Application No. PCT/NZ2012/000084, dated Jan. 30, 2013.

Office Action mailed May 8, 2013 from U.S. Appl. No. 13/672,260, filed Nov. 8, 2012.

Office Action mailed Jun. 4, 2013 from U.S. Appl. No. 13/159,501, filed Jun. 14, 2011.

Office Action mailed May 21, 2013 from U.S. Appl. No. 12/718,620, filed Mar. 5, 2010.

Office Action mailed Jul. 12, 2013 from U.S. Appl. No. 13/227,165, filed Sep. 7, 2011.

"Vision Based Global Localization for Intelligent Vehicles", T.K. Xia, M. Yang, and R.Q. Yang, Research Institute of Robotics, Automation Department, Shanghao Jiao Tong University, P.R. China, Intelligent Vehicles Symposium in Tokyo Japan, Jun. 13-15, 2006, 6 pages.

"Unmanned Tracked Ground Vehicle for Natural Environments", J. Ibañ-Guzmán, X. Jian, A. Malcolm and Z. Gong, Singapore Institute of Manufacturing Technology, Singapore, Chun Wah Chan, Defense Science and Technology Agency, Singapore, and Alex Tay, Nanyang Technological University, School of Computer Science, Singapore, no date, 9 pages.

Office Action from U.S. Appl. No. 13/159,501 mailed Jan. 10, 2013.

Office Action from U.S. Appl. No. 12/660,616 mailed Nov. 27, 2012.

"Three Engineers, Hundreds of Robots, One Warehouse," Guizzo, IEEE Spectrum, Jul. 2008.

Office Action from U.S. Appl. No. 13/116,600 mailed Dec. 31, 2012.

Search Report/Written Opinion from PCT/NZ2012/000051 mailed Jan. 2, 2013.

Search Report/Written Opinion from PCT/NZ2012/000091 mailed Oct. 31, 2012.

Search Report/Written Opinion from PCT/US2012/054062 mailed Nov. 27, 2012.

Search Report/Written Opinion from PCT/US2012/052247 mailed Nov. 27, 2012.

Borenstein et al. "Mobile Robot Positioning—Sensors and Techniques", Journal of Robotic Systems, Special Issue on Mobile Robots, vol. 14, No. 4, pp. 231-249, Apr. 1997.

Harmon et al., "A Technique for Coordinating Autonomous Robots", Autonomous Systems Branch Naval Ocean Systems Center San Diego, CA 92152, 1986.

(56) References Cited

OTHER PUBLICATIONS

Jansfelt et al., "Laser Based Position Acquisition and Tracking in an Indoor Environment", Proc. Int. Symp. Robotics and Automation, 1998.

Siadat et al., "An Optimized Segmentation Method for a 2D Laser-Scanner Applied to Mobile Robot Navigation", Proceedings of the 3rd IFAC Sympo9sium on Intelligent Components and Instruments for Control Applications, 1997.

\* cited by examiner

METHOD AND APPARATUS FOR PROVIDING ACCURATE LOCALIZATION FOR AN INDUSTRIAL VEHICLE

CROSS-REFERENCE TO RELATED APPLICATIONS

This application is a continuation-in-part of co-pending U.S. patent application Ser. No. 13/116,600, filed May 26, 2011, which is herein incorporated by reference in its entirety.

BACKGROUND

1. Technical Field

Embodiments of the present invention generally relate to industrial vehicle automation and, more particularly, to a method and apparatus for providing accurate localization for an industrial vehicle.

2. Description of the Related Art

Entities regularly operate numerous facilities in order to meet supply and/or demand goals. For example, small to large corporations, government organizations and/or the like employ a variety of logistics management and inventory management paradigms to move objects (e.g., raw materials, goods, machines and/or the like) into a variety of physical environments (e.g., warehouses, cold rooms, factories, plants, stores and/or the like). A multinational company may build warehouses in one country to store raw materials for manufacture into goods, which are housed in a warehouse in another country for distribution into local retail markets. The warehouses must be well-organized in order to maintain and/or improve production and sales. If raw materials are not transported to the factory at an optimal rate, fewer goods are manufactured. As a result, revenue is not generated for the unmanufactured goods to counterbalance the costs of the raw materials.

Unfortunately, physical environments, such as warehouses, have several limitations that prevent timely completion of various tasks. Warehouses and other shared use spaces, for instance, must be safe for a human work force. Some employees operate heavy machinery and industrial vehicles, such as forklifts, which have the potential to cause severe or deadly injury. Nonetheless, human beings are required to use the industrial vehicles to complete tasks, which include object handling tasks, such as moving pallets of goods to different locations within a warehouse. Most warehouses employ a large number of forklift drivers and forklifts to move objects. In order to increase productivity, these warehouses simply add more forklifts and forklift drivers.

In order to mitigate the aforementioned problems, some warehouses utilize equipment for automating these tasks. As an example, these warehouses may employ automated industrial vehicles, such as forklifts, to carry objects on paths. When automating an industrial vehicle a key requirement is the ability to accurately locate the vehicle in the warehouse; to achieve this, a plurality of sensors are frequently used to determine the vehicle position (x, y location and orientation) within the physical environment. One solution uses a rotating laser or fixed camera to measure the distance to specific, defined or coded markers. However, this approach has the drawback of requiring detailed environment surveying to measure the global location of the defined or coded markers, which increases the overall system deployment time and cost. Another solution uses three-dimensional sensors, such as from three-dimensional lasers and/or cameras, to localize an industrial vehicle. This approach, however, requires complex computations, which are increased through the use of larger information sets and, where reference maps are required, there is significant cost and time involved in creating and verifying the correctness.

Therefore, there is a need in the art for a method and apparatus for providing accurate localization by using two-dimensional (planar) sensing on an industrial vehicle.

SUMMARY

Various embodiments of the present invention generally include a method and apparatus for providing accurate localization of an industrial vehicle; including processing at least one sensor input message from a plurality of sensor devices, wherein the at least one sensor input message includes information regarding observed environmental features; determining position measurements associated with the industrial vehicle in response to at least one sensor input message, wherein the plurality of sensor devices comprises a two-dimensional laser scanner, and at least one other sensor device selected from an odometer, an ultrasonic sensor, a compass, an accelerometer, a gyroscope, an inertial measurement unit (IMU), or an imaging sensor; and updating a vehicle state using the position measurements.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
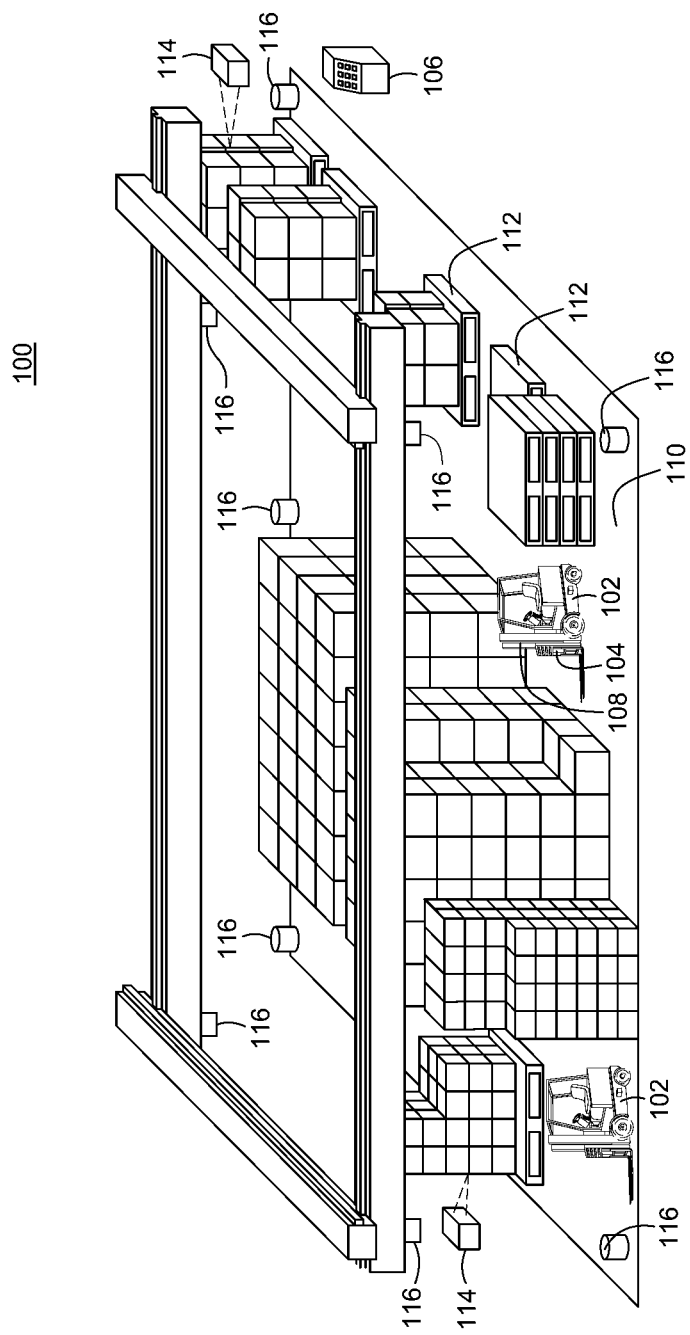
FIG. 1 is a perspective view of a physical environment comprising various embodiments of the present disclosure.

FIG. 1 is a perspective view of a physical environment 100 comprising one or more embodiments of the present disclosure.

In some embodiments, the physical environment 100 includes a vehicle 102 that is coupled to a mobile computer 104, a central computer 106 as well as a sensor array 108. The sensor array 108 includes a plurality of devices for analyzing various objects within the physical environment 100 and transmitting data (e.g., two-dimensional range data, three-dimensional range data, image data, odometer data, ultrasonic range data, accelerometer data, gyroscope data, IMU data and/or the like) to the mobile computer 104 and/or the central computer 106, as explained further below. Sensor array 108 includes various types of sensors, such as laser range finders, encoders, ultrasonic range finders, cameras, pressure transducers, compass, accelerometers, gyroscopes, inertial measurement units (IMUS), and/or the like.

The physical environment 100 further includes a floor 110 supporting a plurality of objects. The plurality of objects include a plurality of pallets 112, a plurality of units 114 and/or the like as explained further below. The physical environment 100 may include various obstructions (not pictured) to the proper operation of the vehicle 102. Some of the plurality of objects may constitute as obstructions along various paths (e.g., pre-programmed or dynamically computed routes) if such objects disrupt task completion.

The physical environment 100 also includes a plurality of markers 116. The plurality of markers 116 are illustrated as objects attached to a ceiling and the floor 110, but may be located throughout the physical environment 100. In some embodiments, the plurality of markers 116 are beacons that facilitate environment based navigation as explained further below. The plurality of markers 116 as well as other objects around the physical environment 100 form environment features. The mobile computer 104 extracts the environment features and determines an accurate, current vehicle position.

The physical environment 100 may include a warehouse or cold store for housing the plurality of units 114 in preparation for future transportation. Warehouses may include loading docks to load and unload the plurality of units from commercial vehicles, railways, airports and/or seaports. The plurality of units 114 generally includes various goods, products and/or raw materials and/or the like. For example, the plurality of units 114 may be consumer goods that are placed on ISO standard pallets and loaded into pallet racks by forklifts to be distributed to retail stores. The vehicle 102 facilitates such a distribution by moving the consumer goods to designated locations where commercial vehicles (e.g., trucks) load and subsequently deliver the consumer goods to one or more target destinations.

According to one or more embodiments, the vehicle 102 may be an automated guided vehicle (AGV), such as an automated forklift, which is configured to handle and/or move the plurality of units 114 about the floor 110. The vehicle 102 utilizes one or more lifting elements, such as forks, to lift one or more units 114, and then transport these units 114 along a path to be placed at a designated location. Alternatively, the one or more units 114 may be arranged on a pallet 112 of which the vehicle 102 lifts and moves to the designated location.

Each of the plurality of pallets 112 is a flat transport structure that supports goods in a stable fashion while being lifted by the vehicle 102 and/or another jacking device (e.g., a pallet jack and/or a front loader). The pallet 112 is the structural foundation of an object load and permits handling and storage efficiencies. Various ones of the plurality of pallets 112 may be utilized within a rack system (not pictured). Within a typical rack system, gravity rollers or tracks allow one or more units 114 on one or more pallets 112 to flow to the front. The one or more pallets 112 move forward until slowed or stopped by a retarding device, a physical stop or another pallet 112.

In some embodiments, the mobile computer 104 and the central computer 106 are computing devices that control the vehicle 102 and perform various tasks within the physical environment 100. The mobile computer 104 is adapted to couple with the vehicle 102 as illustrated. The mobile computer 104 may also receive and aggregate data (e.g., laser scanner data, image data and/or any other related sensor data) that is transmitted by the sensor array 108. Various software modules within the mobile computer 104 control operation of hardware components associated with the vehicle 102 as explained further below.

FIG. 1 illustrates an industrial area having forklifts equipped with various sensor devices, such as a laser scanner, an encoder, or a camera. As explained further below, the mobile computer 104 calculates a vehicle change in position using a series of measurements, such as wheel rotations. One or more sensor devices are coupled to the wheels and provide an independent measurement of distance travelled by each of these wheels from which odometry data is calculated. Alternatively an Inertial Measurement Unit (IMU) may be used to measure odometry data. One or more two-dimensional laser scanners provide details of the physical environment 100 in the form of range readings and their corresponding angles from the vehicle 102. From the laser data, the mobile computer 104 extracts environmental features, such as straight lines, corners, arcs, markers, and/or the like. A camera may provide three-dimensional information including height measurements. Landmarks may also be extracted from the camera data based on various characteristics, such as color, size, depth, position, orientation, texture, and/or the like in addition to the extracted features.

Using a filter (e.g., an Extended Kalman Filter (EKF)), the mobile computer 104 models the position of the vehicle in the two-dimensional plane (i.e. the (x, y) coordinates and the heading of the vehicle 102) as a probability density. The odometry data is used for updating the predicted position of the vehicle, and the environmental features extracted from the laser scan can be compared with a known map which includes known environmental features and/or a list of dynamic environmental features maintained by the filter to correct for error in the vehicle position.

Figure 2:
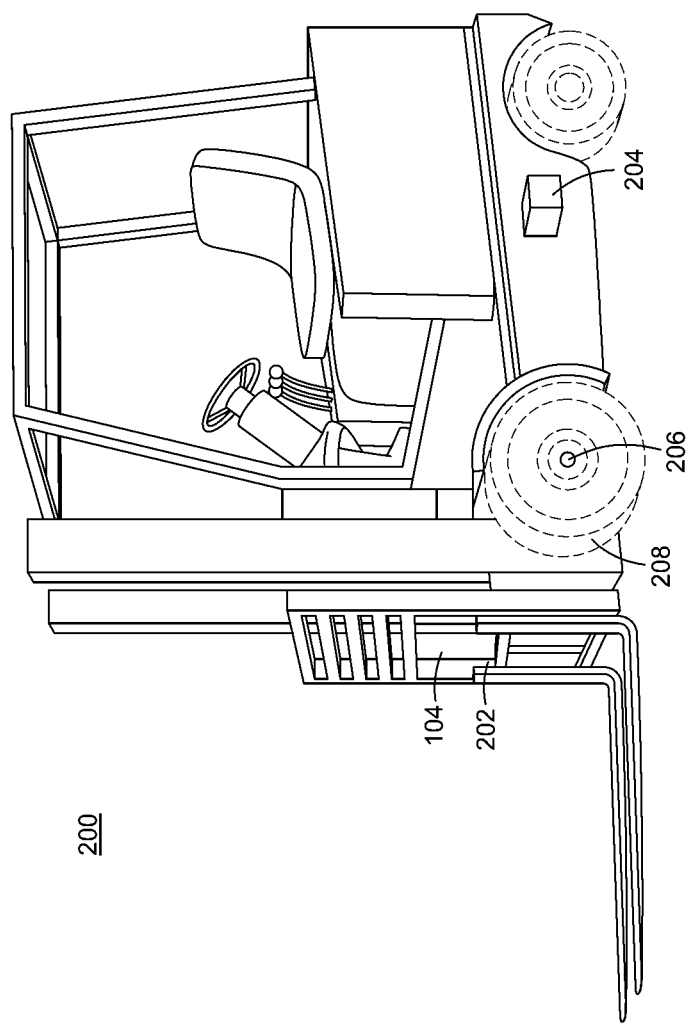
FIG. 2 illustrates a perspective view of the forklift for navigating a physical environment to perform various tasks according to one or more embodiments.

FIG. 2 illustrates a perspective view of the forklift 200 for performing various tasks within a physical environment according to one or more embodiments of the present disclosure.

The forklift 200 (i.e., a lift truck, a high/low, a stacker-truck, trailer loader, side-loader or a fork hoist) is a powered industrial truck having various load capacities and used to lift and transport various objects. In some embodiments, the forklift 200 is configured to move one or more pallets (e.g., the pallets 112 of FIG. 1) of units (e.g., the units 114 of FIG. 1) along paths within the physical environment (e.g., the physical environment 100 of FIG. 1). The paths may be pre-defined or dynamically computed as tasks are received. The forklift 200 may travel inside a storage bay that is multiple pallet positions deep to place or retrieve a pallet. Oftentimes, the forklift 200 places the pallet on cantilevered arms or rails.

The forklift 200 typically includes two or more forks (i.e., skids or tines) for lifting and carrying units within the physical environment. Alternatively, instead of the two or more forks, the forklift 200 may include one or more metal poles (not pictured) in order to lift certain units (e.g., carpet rolls, metal coils and/or the like). In one embodiment, the forklift 200 includes hydraulics-powered, telescopic forks that permit two or more pallets to be placed behind each other without an aisle between these pallets.

The forklift 200 may further include various mechanical, hydraulic, and/or electrically operated actuators according to one or more embodiments. In some embodiments, the forklift 200 includes one or more hydraulic actuators (not labeled) that permit lateral and/or rotational movement of two or more forks as are common in forklifts. In one embodiment, the forklift 200 includes a hydraulic actuator (not labeled) for moving the forks together and apart. In another embodiment, the forklift 200 includes a mechanical or hydraulic component for squeezing a unit (e.g., barrels, kegs, paper rolls, and/or the like) to be transported.

The forklift 200 may be coupled with the mobile computer 104, which includes software modules for operating the forklift 200 in accordance with one or more tasks. The forklift 200 is also coupled with an array comprising various sensor devices (e.g., the sensor array 108 of FIG. 1), which transmits sensor data (e.g., two-dimensional range data, image data, three-dimensional range data, and the like) to the mobile computer 104 for extracting information associated with environmental features. These devices may be mounted to the forklift 200 at any exterior and/or interior position or mounted at known locations around the physical environment 100. Exemplary embodiments of the forklift 200 typically include a planar laser scanner 204 attached to each side and/or an encoder 206 attached to each wheel 208. In other embodiments, the forklift 200 includes a camera 202, and/or a planar laser scanner 204 and/or the encoder 206. Encoders 206 determine motion data related to vehicle movement. Externally mounted sensors may include laser scanners or cameras positioned where the rich data set available from such sensors would enhance automated operations. External sensors may include a limited set of transponders and/or other active or passive means by which an automated vehicle could obtain an approximate position and/or process within a filter for determining vehicle state.

In some embodiments, a number of the sensor devices (e.g., laser scanners, laser range finders, encoders (i.e., odometry), pressure transducers and/or the like) as well as their position on the forklift 200 are vehicle dependent and the position at which these sensors are mounted affects the processing of the measurement data. For example, by ensuring that all of the laser scanners are placed at a measureable position, the sensor array may process the laser scan data and transpose it to a center point for the forklift 200 or another common reference frame. Furthermore, the sensor array may combine multiple laser scans into a single virtual laser scan, which may be used by various software modules to control the forklift 200.

Figure 3:
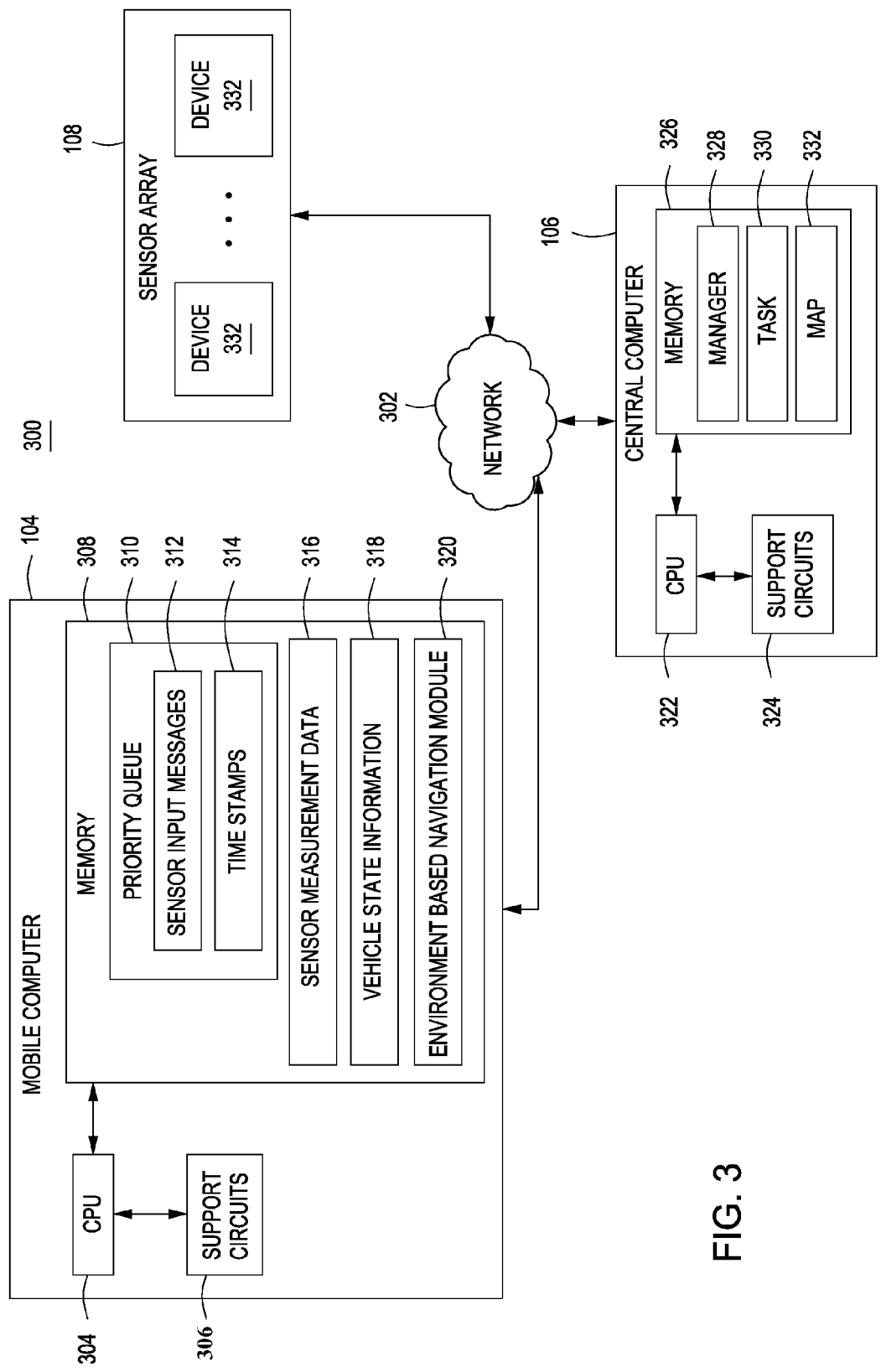
FIG. 3 is a structural block diagram of a system for providing accurate position localization for an industrial vehicle according to one or more embodiments.

FIG. 3 is a structural block diagram of a system 300 for providing accurate position localization for an industrial vehicle according to one or more embodiments. In some embodiments, the system 300 includes the mobile computer 104, the central computer 106, and the sensor array 108 in which each component is coupled to each other through a network 302.

The mobile computer 104 may comprise a type of computing device (e.g., a laptop, a desktop, a Personal Desk Assistant (PDA), an iPad, tablet, smartphone, and the like), which comprises a central processing unit (CPU) 304, various support circuits 306, and a memory 308. The CPU 304 may comprise one or more commercially available microprocessors or microcontrollers that facilitate data processing and storage. Various support circuits 306 facilitate operation of the CPU 304 and may include clock circuits, buses, power supplies, input/output circuits, and/or the like. The memory 308 may include a read only memory, random access memory, disk drive storage, optical storage, removable storage, and the like. The memory 308 may include various data, such as a priority queue 310 having sensor input messages 312 and time stamps 314, sensor measurement data 316, and vehicle state information 318. Each time stamp 314 indicates an acquisition time for a corresponding one of the sensor input messages 312. The memory 308 includes various software packages, such as an environment based navigation module 320.

The central computer 106 is a type of computing device (e.g., a laptop computer, a desktop computer, a Personal Desk Assistant (PDA), an iPad, tablet, a smartphone, or the like) that comprises a central processing unit (CPU) 322, various support circuits 324 and a memory 326. The CPU 322 may comprise one or more commercially available microprocessors or microcontrollers that facilitate data processing and storage. Various support circuits 324 facilitate operation of the CPU 322 and may include clock circuits, buses, power supplies, input/output circuits, and/or the like. The memory 326 may include a read only memory, random access memory, disk drive storage, optical storage, removable storage, or the like. The memory 326 includes various software packages, such as a manager 328, as well as various data, such as tasks 330 and map data 332.

The network 302 comprises a communication system that connects computers by wire, cable, fiber optic, and/or wireless links facilitated by various types of well-known network elements, such as hubs, switches, routers, and the like. The network 302 may employ various well-known protocols to communicate information amongst the network resources. For example, the network 302 may be part of the Internet or intranet using various communications infrastructures such as Ethernet, WiFi, WiMax, General Packet Radio Service (GPRS), or the like, and can further comprise various cloud-computing infrastructures, platforms, and applications.

The sensor array 108 is communicably coupled to the mobile computer 104, which is attached to an automated vehicle, such as a forklift (e.g., the forklift 200 of FIG. 2). The sensor array 108 includes a plurality of devices 332 for monitoring a physical environment and capturing various observations, which is stored by the mobile computer 104 as the sensor input messages 312. In some embodiments, the sensor array 108 may include any combination of devices, such as one or more laser scanners, encoders, cameras, odometer, an ultrasonic sensor, a compass, an accelerometer, a gyroscope, an inertial measurement unit (IMU), and an imaging sensor, and/or the like. For example, a laser scanner may be a planar laser scanner that is located in a fixed position on the forklift body where its field of view extends to cover an area near the forklift. The plurality of devices 332 (for e.g., sensors 108, cameras 202, laser scanners 204, encoder 206, or the like) may also be distributed throughout the physical environment at fixed and/or moving positions.

In some embodiments, the sensor measurement data 316 includes an aggregation of the sensor data that is transmitted by and represent observations of the plurality of devices 332 regarding the physical environment. The aggregated sensor data may include information associated with static and/or dynamic environmental features. In some embodiments, the sensor measurement data 316 is corrected with respect to time and/or motion distortion in order to determine a current vehicle position and update the vehicle state information 318 as explained further below.

The priority queue 310 stores observed sensor data over a period of time in the form of the sensor input messages 312 along with data sources and the measurement time stamps 314. In some embodiments, the environment based navigation module 320 inserts each sensor input message 312 into the priority queue 310 based on a priority. The environment based navigation module 320 uses various factors, such as an acquisition time, to determine the priority for each of the sensor input message 312 according to some embodiments.

The vehicle state information 318 describes one or more states (e.g., a previous and/or a current vehicle state) of the vehicle at various times $k_t$. In some embodiments, the vehicle state information 318 includes an estimate of vehicle position (x, y location and orientation) which the present disclosure may refer to as the position prediction. In some embodiments, the vehicle state information 318 includes an update of the position prediction in view of a previous vehicle position, odometry data and/or planar laser scanner data. In some embodiments, the vehicle state information 318 includes vehicle velocity and other motion data related to vehicle movement. For example, the other motion data is a temporal characteristic representing distortion caused by the vehicle movement during a laser scan.

The environment based navigation module 320 uses a filter (e.g., a process filter, such as an Extended Kalman Filter) to produce a position prediction based on a prior vehicle state, and then to update the position prediction using the position measurement data 310. Based on odometry data from the sensor array 108, such as an encoder attached to a wheel, or other position prediction data such as data from an Inertial Measurement Unit, the environment based navigation module 320 estimates a current vehicle state. Using a wheel diameter, for example, the environment based navigation module 320 computes the distance traveled by the industrial vehicle 102 from a prior vehicle position. As another example, the encoder may directly measure surface velocity of the wheel and communicate such a measurement to the environment based navigation module 320. This information about distance travelled is integrated with the previously calculated vehicle state estimate to give a new vehicle state estimate. The environment based navigation module 320 may also use the filter to estimate uncertainty and/or noise associated with the current vehicle state (e.g., vehicle position).

The environment based navigation module 320 accesses the priority queue 310 and examines the sensor input messages 312 in order of reception time. In some embodiments, the environment based navigation module 320 rearranges (e.g., sorts) the sensor input messages 312 prior to updating the vehicle state information 318. The sensor input messages 312 are to be rearranged according to internal system delays and/or characteristic measurement delays associated with a sensor. Each data source has a measureable internal system delay, which can be used as an estimate of the measurement time. Processing the rearranged sensor input messages 312 enables accurate position localization and mapping because the order at which the sensor input messages 312 are retrieved is the same order at which the data in the sensor input messages 312 is acquired by the sensor devices 332.

In some embodiments, the environment based navigation module 320 performs an observation-update step in the order of the acquisition time instead of reception time. Based on the prior vehicle state and the current position prediction, the environment based navigation module 320 executes a data fusion technique to integrate available odometry data and correct the current position prediction. The environment based navigation module 320 uses the current position prediction to update the vehicle state information 318 with an accurate vehicle position (x, y location and heading).

Figure 4:
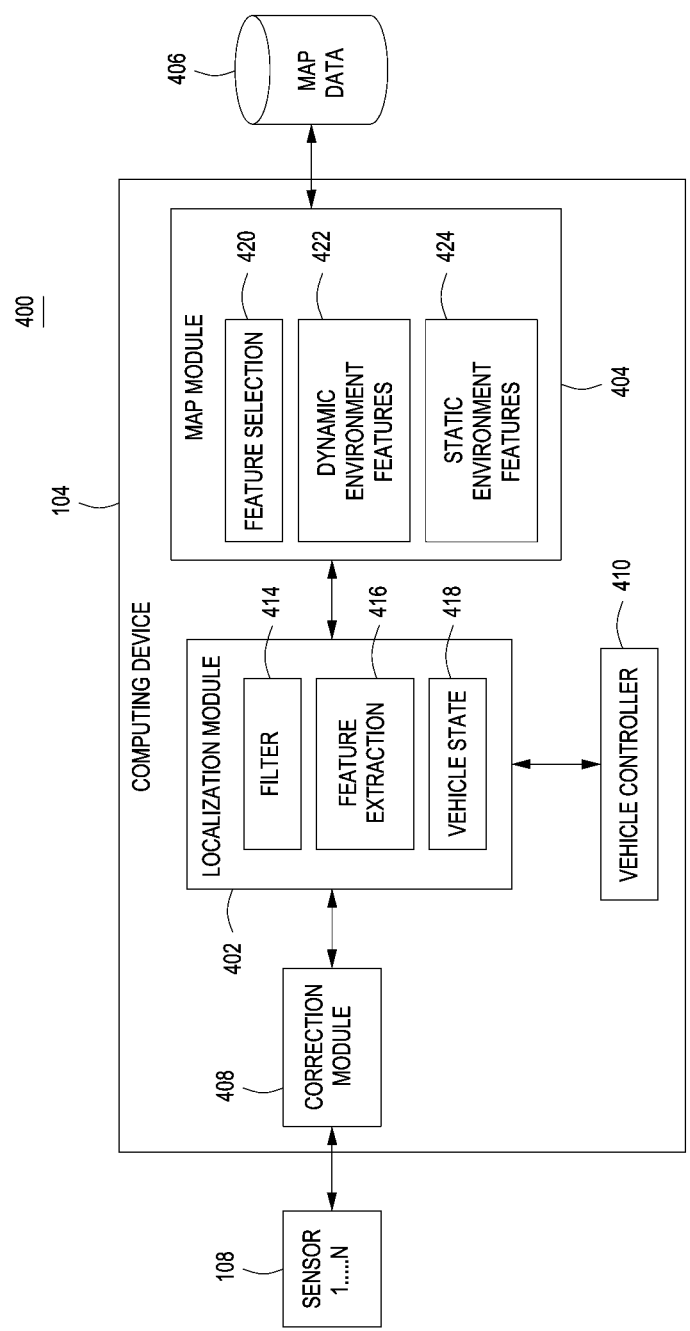
FIG. 4 is a functional block diagram of a system for providing accurate localization for an industrial vehicle according to one or more embodiments.

FIG. 4 is a functional block diagram of a system 400 for providing accurate localization for an industrial vehicle according to one or more embodiments. The system 400 includes the mobile computer 104, which couples to an industrial vehicle, such as a forklift, as well as the sensor array 108. Various software modules within the mobile computer 104 collectively form an environment based navigation module (e.g., the environment based navigation module 320 of FIG. 3).

The mobile computer 104 includes various software modules (i.e., components) for performing navigational functions, such as a localization module 402, a mapping module 404, a correction module 408, and a vehicle controller 410. The mobile computer 104 provides accurate position for the industrial vehicle and may update the map data 406 with information associated with environmental features. The localization module 402 also includes various components, such as a filter 414 and a feature extraction module 416, for determining a vehicle state 418. The map module 404 includes various data, such as dynamic environment features 422 and static environment features 424. The map module 404 also includes various components, such as a feature selection module 420.

In some embodiments, the correction module 408 processes one or more sensor input data messages and examines observed sensor data therein. The correction module 408 eliminates motion and/or time distortion artifacts prior to the data being processed by the filter 414.

Figure 5:
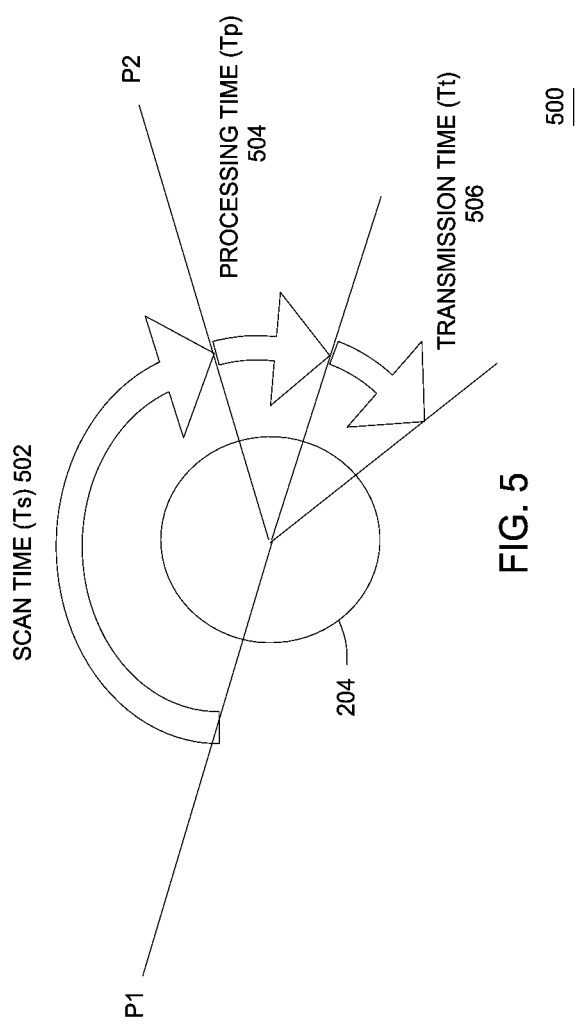
FIG. 5 illustrates motion and time distortion associated with vehicle movement within the physical environment according to one or more embodiments.

FIG. 5 illustrates the planar laser scanner 204 performing a laser scan 500 within a field of view according to one or more embodiments. As mentioned above, the forklift 200 may be moving in a particular direction (e.g., forward) during the laser scan 500. As described in detail further below, a mobile computer (e.g., the mobile computer 104 of FIG. 1) executes an environment based navigation module 320, which corrects laser scanner data to account for vehicle movement, resulting in accurate localization.

Between a field of view from $P_1$ to $P_2$, the planar laser scanner 204 performs the laser scan during scan time $(T_s)$ 502. Alternatively, when the planar laser scanner is a rotating type scanner with a single range bearing measuring device rotating clock-wise making measurements from $P_1$ to $P_2$ an instantaneous scan time $(T_s)$ 502 may be associated with discrete scan readings, resulting in an array of times for the scan times with an associated range and bearing data point. A time period required for processing the laser scanner data is stored as processing time $(T_p)$. Next, the laser scanner data is transmitted to a process filter in a form of a sensor input message during a transmission time $(T_t)$ 506. Collectively, the $T_s$ 502, the $T_p$ 504, and the $T_t$ 506 constitute a latency between acquisition and availability of the laser scanner data to the process filter for updating a vehicle state. The environment based navigation module accounts for such a latency using a constant value (e.g., a sum of values consisting of one-half of the $T_s$ 502, the $T_p$ 504, and the $T_t$ 506). If the $T_p$ 504 cannot be computed because the internal processing of the laser is unknown, the process filter uses a time associated with the availability of the sensor input message and a publication rate (i.e., periodicity of laser scanning) to estimate the $T_p$ 504.

Figure 6:
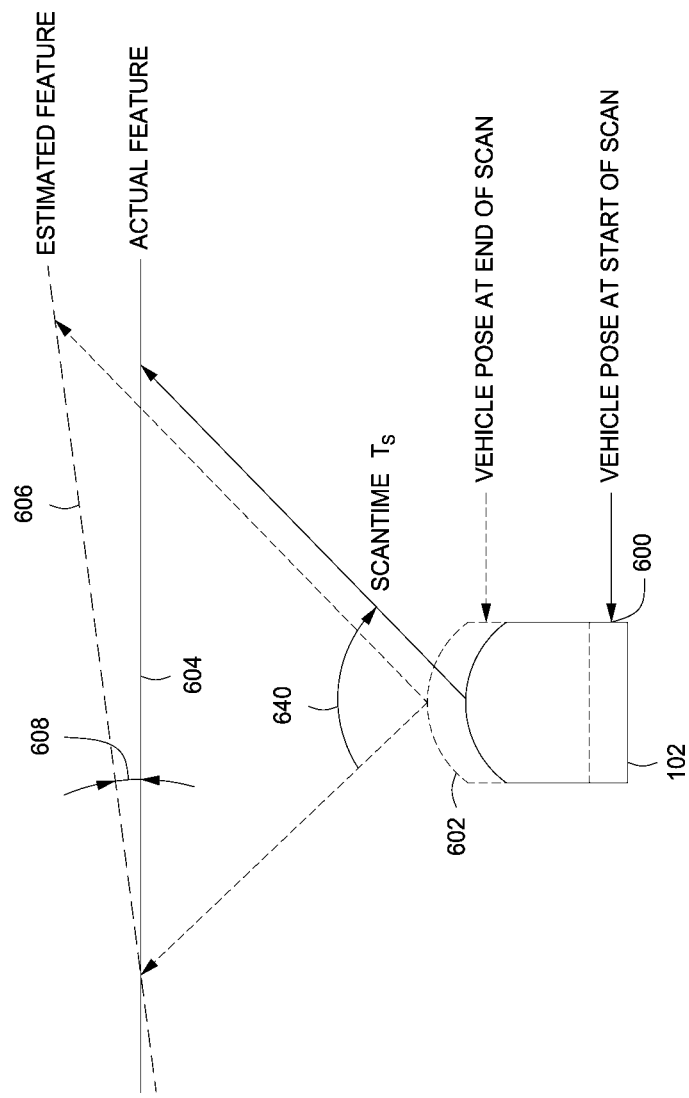
FIG. 6 illustrates a planar laser scanner performing a laser scan within a field of view according to one or more embodiments.

FIG. 6 illustrates motion distortion associated with the vehicle 102 movement within the physical environment 100 according to one or more embodiments. Specifically, the vehicle 102 is depicted as moving closer to a feature, for example wall 604, during a scan by various sensor devices, such as rotary types of planar laser scanners. As these sensor devices capture laser scanner data, the vehicle 102 starts at position 600, moves in a straight forward direction and finally, ends at a position 602. The vehicle 102 movement causes motion artifacts in the laser scanner data that distort coordinates of various environmental features. The motion of the vehicle during the scan causes an estimation error 608 in the angle of the wall resulting in the wall position being estimated as that shown as 606. Those skilled in the art will realize that rotational motion of the laser scanner may cause more complex distortions of observed features which, if uncorrected, will create significant errors in the vehicle position estimate. These errors grow as the velocity of the vehicle increases.

The environment based navigation module collects vehicle motion data, such as odometry data, during the scan time $T_s$ 502 and corrects the planar laser scanner data. In some embodiments, the vehicle motion data includes parameters for determining a distance and/or direction traveled, which is used to adjust coordinates associated various environmental features. After removing motion artifacts caused by the vehicle movement, the environment based navigation module uses the $T_s$ 502 to update a previous vehicle position prediction and determine a current vehicle state.

In some embodiments, the correction module 408 inserts the one or more sensor input data messages into a queue. The correction module 408 subsequently sorts the sensor input messages based on the corrected acquisition time. When a sensor input message from a trigger data source become available to the correction module 408, a filter update process is performed on the queue by the localization module 402, which integrates remaining sensor data into the position measurements to determine a current vehicle position. For example, the trigger data source may be a particular type of sensor device, such as a laser scanner.

In addition to the filter 414 for calculating the vehicle state 418, the localization module 402 also includes the feature extraction module 416 for extracting features from the corrected sensor data. The map module 404 compares the vehicle state 418 with the dynamic features 422 and/or the static features 424 in order to eliminate unrelated features, which reduce a total number of features to examine. The feature selection module 420 manages addition and modification of the dynamic features 422 to the map data 406. The feature selection module 420 can update the map data 406 to indicate areas recently occupied or cleared of certain features, such as known placed and picked items.

The filter 414 compares extracted features from the corrected sensor data with known mapped environment features and/or integrates sensor data and corrects the position prediction to account for an incorrect estimation and/or observed environment features uncertainty and updates the vehicle state 418. The filter 414 determines the vehicle state 418 and may instruct the mapping module 404 to update the map data 406 with information associated with the dynamic features 422. The vehicle state 418, which is modeled by the filter 414, refers to a current vehicle state and includes data indicating vehicle position (e.g., coordinates for x, y and orientation) as well as movement (e.g., vehicle velocity, acceleration and/or the like). The localization module 402 communicates data associated with the vehicle state 418 to the mapping module 404 while also communicating such data to the vehicle controller 410. Based on the vehicle position, the vehicle controller 410 navigates the industrial vehicle to a destination.

It is appreciated that the system 400 may employ several computing devices to perform environment based navigation. Any of the software modules within the computing device 104 may be deployed on different or multiple physical hardware components, such as other computing devices. The mapping module 404, for instance, may be executed on a server computer (e.g., the central computer 102 of FIG. 1) over a network (e.g., the network 302 of FIG. 3) to connect with multiple mobile computing devices for the purpose of sharing and updating the map data 406 with a current vehicle position.

In some embodiments, the correction module 408 processes sensor input messages from disparate data sources, such as the sensor array 108, having different sample/publish rates for the vehicle state 418 as well as different (internal) system delays. Due to the different sampling periods and system delays, the order at which the sensor input messages are acquired is not the same as the order at which the sensor input messages eventually became available to the computing device 104. The feature extraction module 416 extracts observed environment features from the sensor data within these messages. The localization module 402 examines each message separately in order to preserve the consistency of each observation. Such an examination may be performed instead of fusing the sensor data to avoid any dead reckoning errors.

Figure 7A:
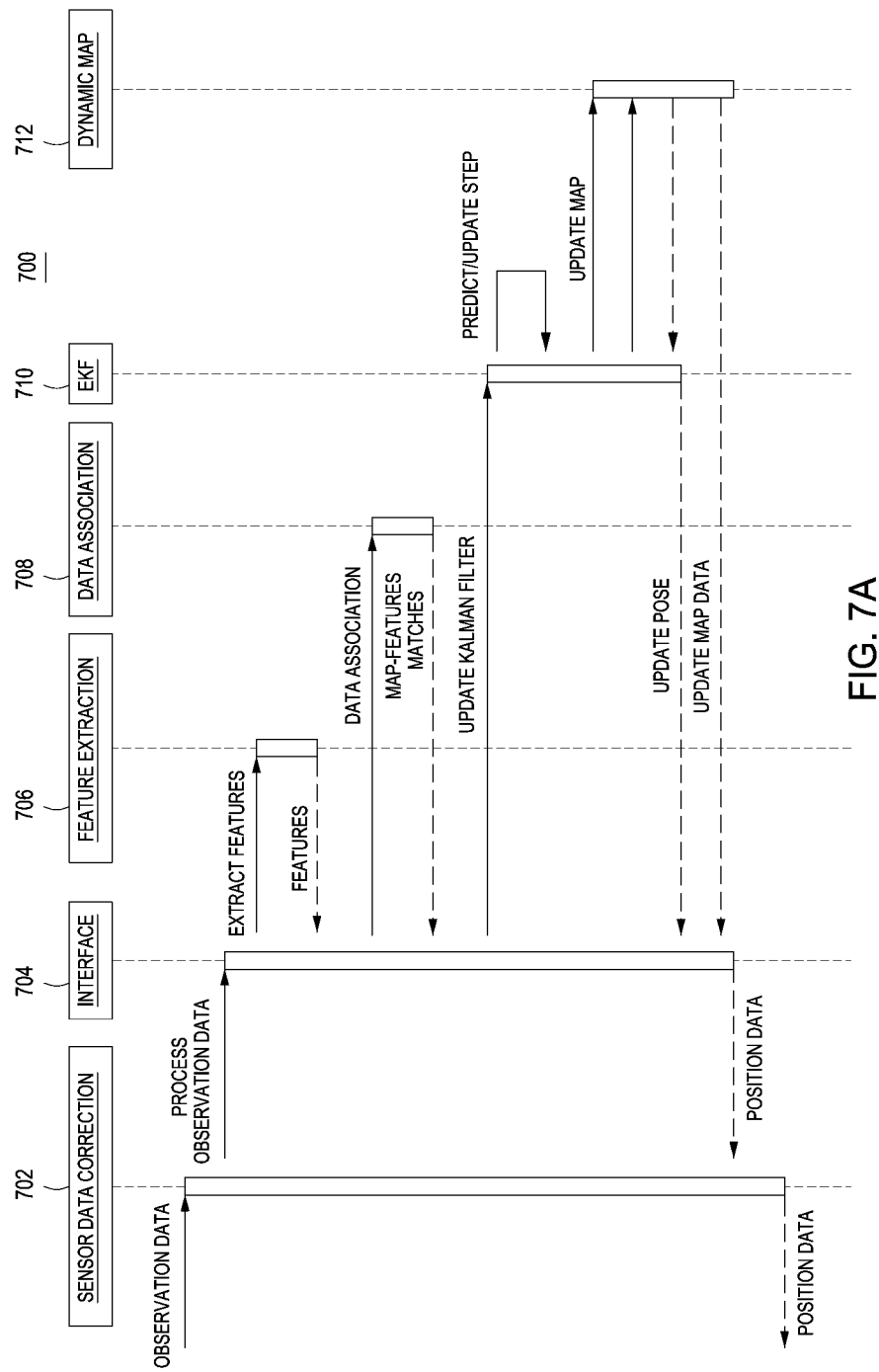
FIGS. 7A-B are interaction diagrams illustrating a localization process for an industrial vehicle according to one or more embodiments.

FIG. 7A is an interaction diagram illustrating a localization and mapping process 700 for an industrial vehicle according to one or more embodiments. Specifically, the localization and mapping process 700 includes processing and communicating various data between components or layers, such as sensor data correction 702, an interface 704, feature extraction 706, data association 708, EKF 710 and dynamic map 712. The localization and mapping process 700 supports industrial vehicle operation using primarily environmental features. The interface 704 facilitates control over the layers and is added to an environment based navigation module.

The feature extraction 706 examines data inputted by sensor devices and extracts observed environment features (e.g. lines and corners). The data association 708 compares the observed features with known static 424 and/or dynamic 422 environment feature information to identify matching features with the known map data. The EKF 710 is an Extended Kalman Filter that, given measurements associated with the matching features and a previous vehicle position, provides a most likely current vehicle position. The dynamic map manager 712 maintains an up-to-date dynamic map of dynamic environment features used for localization that are not found in a-priori static map. The dynamic map 712 makes features available for the data association 708 such that both static and dynamic environment features are examined.

Figure 7B:
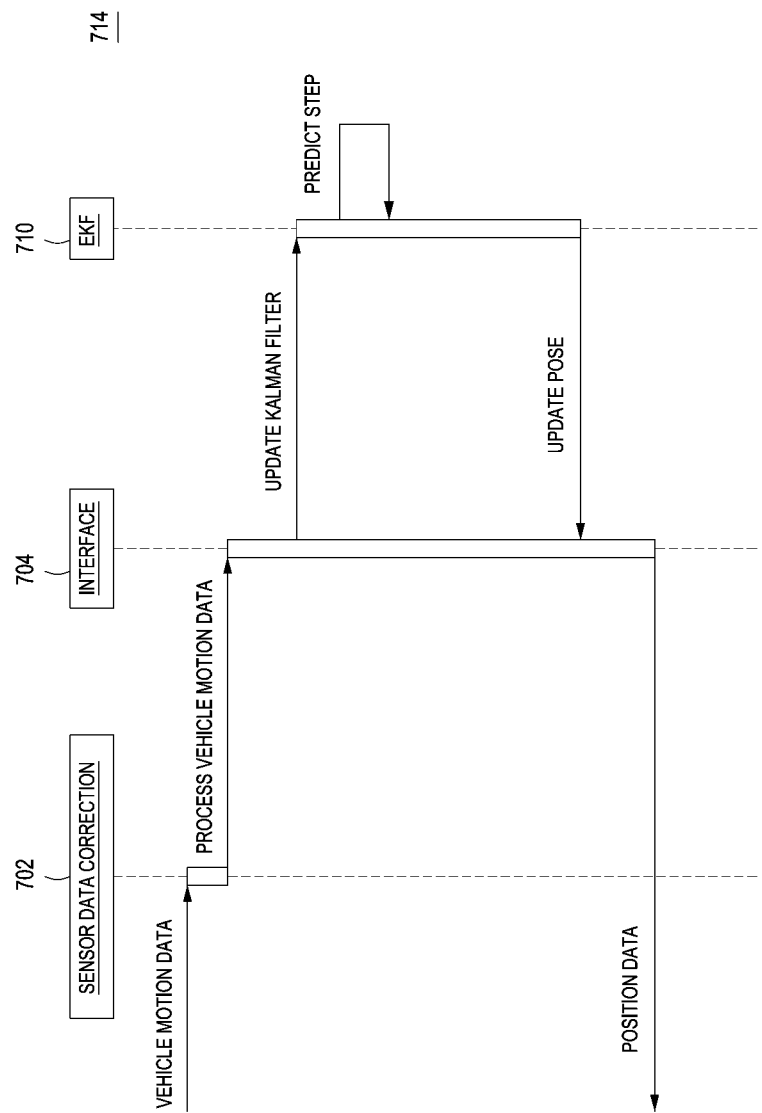

FIG. 7B is an interaction diagram illustrating a localization process 714 using vehicle motion data associated with the industrial vehicle according to one or more embodiments. The vehicle motion data refers to industrial vehicle movement, which may distort position predictions determined by the EKF 710. For example, the industrial vehicle may be moving as sensor input messages are acquired from the sensor devices (e.g., during a laser scan). These sensor input messages include imprecise sensor data that eventually result in the distorted position predictions and an inaccurate estimate of a next vehicle state. Vehicle motion data can be measured by sensors on the sensor array 108 such as odometry from the wheels and/or an IMU and/or the like.

The sensor data correction 702 is a step in the localization process 714 where timing and/or motion artifacts are removed from the sensor data prior to a vehicle position prediction according to some embodiments. The sensor data correction 702 processes the vehicle motion data, which is determined from various sensor data, and then communicated to the interface 704. For example, the sensor data correction 702 uses a wheel diameter and odometry data to compute velocity measurements and corrects a data acquisition time. The vehicle motion data is passed to the EKF 710 through interface 704. The EKF 710, in response, performs a position prediction in order to estimate current position data and position uncertainty based on the vehicle motion data. Via the interface 704, the corrected current position data is communicated back to the vehicle.

Figure 8:
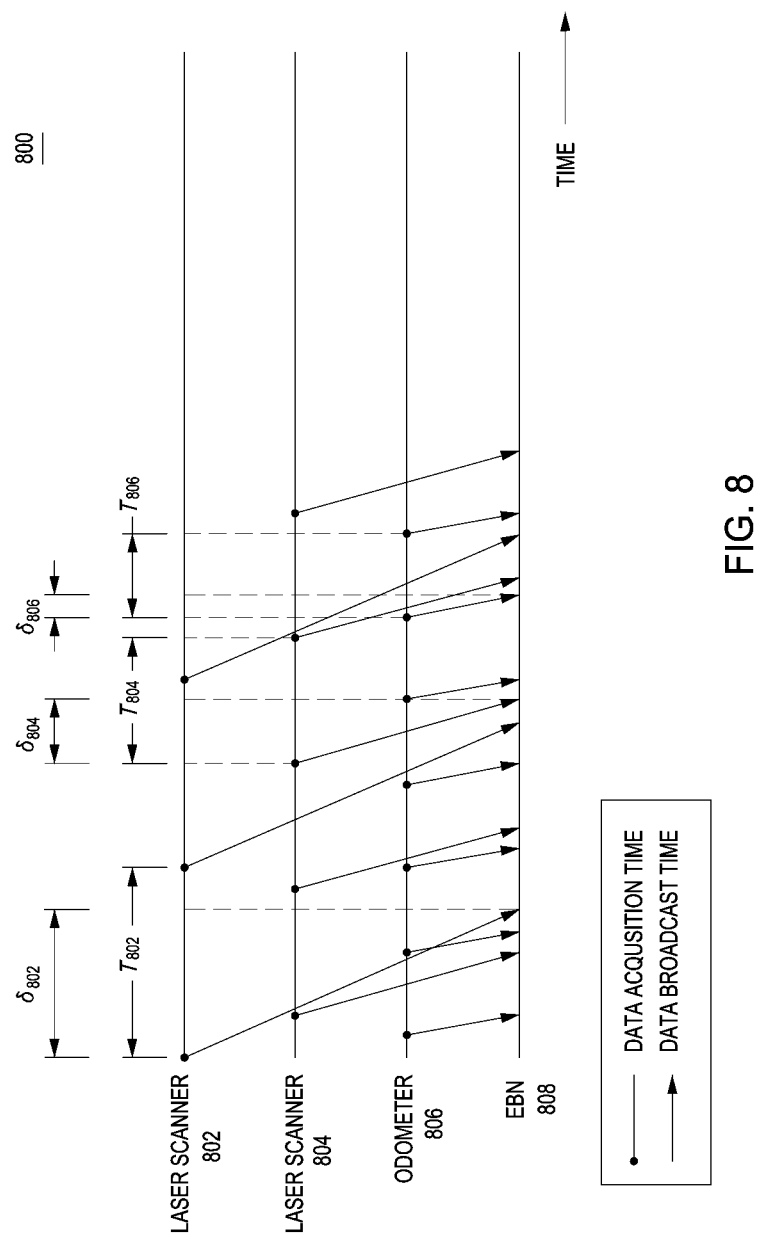
FIG. 8 is an exemplary timing diagram illustrating sensor input message processing according to one or more embodiments.

FIG. 8 is a timing diagram illustrating sensor input message processing 800 according to one or more embodiments. In some embodiments, various sensor devices, such as a laser scanner 802, a laser scanner 804 and an odometer 806, within a sensor array (e.g., the sensor array 108 of FIG. 1) communicate sensor input messages to an environment based navigation module 808. The laser scanner 802 and the laser scanner 804 may represent two dissimilar planar laser devices having different publishing rates and/or different vendors.

In order to mitigate or correct errors caused by time and motion distortion, the environment based navigation module 808 determines position measurements in response to each acquisition time of the sensor input messages. Sensors typically provide information at the time of data acquisition internally within the device, or the time stamp is created at the time when data is made available from the sensor. Such data is subsequently communicated to software modules that form the environment based navigation module 808 for processing, where because of various data sharing techniques (e.g. serial link, Ethernet, or software process) the data arrives out of time sequence when compared to other sensor data.

$T_{802}$, $T_{804}$ and $T_{806}$ are broadcast time periods of the laser scanner 802, the laser scanner 804 and the odometer 806, respectively. $\delta_{802}$, $\delta_{804}$ and $\delta_{806}$ are system delays for processing and transmitting the sensor input messages to the environment based navigation module 808. Because of different sampling periods and different system delays, the order at which the sensor data is acquired by the sensor devices is not the same as the order at which the messages became available to the environment based navigation 808. For example, a first sensor input message from the laser scanner 802 includes observed environment features regarding a vehicle state at an earliest time. However, this message arrives after at least one subsequent sensor input message from the laser scanner 804 and/or the odometer 806, which includes observed environment features and/or motion estimates regarding a vehicle state at a later point in time. When the first sensor input message finally became available to the EBN 808, two sensor input messages from the odometer device 806 have already been made available.

In some embodiments, the publish rates (T) and/or the system delays ($\delta$) are not fixed. The environment based navigation (EBN) module 808 employs a priority queue (e.g., the priority queue 310 of FIG. 3) to address sensor input messages. The EBN executes a prediction-update process after processing a slowest sensor input message broadcast that is also subsequent to a prior prediction-update process. In response to an acquisition time associated with each message, the EBN module 808 uses the sensor data to modify observed environmental features measurements. After examining each sensor input message, the EBN module 808 corrects a position prediction for the industrial vehicle.

Hence, each and every future prediction-update process is a series of filter position prediction and update steps in which each sensor input message in the priority queue is processed in an order of acquisition time stamps (e.g., the acquisition time stamps 314 of FIG. 3). During the update step, the EBN module 808 corrects a position prediction/estimation. Alternatively, the EBN module 808 integrates the sensor data to determine accurate position measurements. For example, the EBN module 808 integrates odometry data over time (i.e., dead reckoning).

As illustrated, messages from the odometer 806 have a smallest system delay amongst the sensor devices, as well as a highest sampling frequency. While the odometer 806 messages are inserted into the priority queue, the EBN module 808 performs one or more position prediction steps and continuously updates the vehicle position (e.g., a current or historical position) estimates. Then, the EBN module 808 delays performance of the update step during which the EBN module 808 integrates the odometry data, but does not correct the vehicle position estimate until the update step is triggered. In some embodiments, a message from a particular type of sensor device, such as the laser scanner 802, constitutes a trigger message that initiates the update step.

As a result of the prediction-update process, the EBN module 808 updates the vehicle position estimate. In some embodiments, the EBN module 808 corrects two-dimensional x, y coordinates and heading related to vehicle position. These coordinates refer to map data associated with a shared use physical environment. In some embodiments, the vehicle position is updated when sensor data from a trigger message becomes available to the EBN module 808 (i.e., broadcast time). Upon the availability of the trigger message, the EBN module 808 processes each and every sensor input message in the priority queue in the order of acquisition time. The updated vehicle position will reflect the observed position measurements at the time of acquisition of the trigger message.

In some embodiments, the update step is triggered before the dead reckoning error exceeds a pre-defined threshold. The EBN module 808 determines under which circumstances, the dead reckoning error is too large. For example, if the priority queue exceeds a certain length (i.e., a number of sensor input messages), sensor input message processing requires an extensive amount of time. The EBN module 808 delays the update step for a sufficient amount of time to ensure that none of the messages are processed out of order of acquisition time. In some embodiments, the update step is delayed until a sensor input message from a data source associated with a longest system delay becomes available. If such data is not received, the EBN module 808 performs the update step based on acquisition time of each available sensor input message. In some embodiments, the EBN module 808 deletes one or more sensor input messages if a current vehicle position estimate has a high confidence and/or for the purpose of reducing resource workloads.

Figure 9:
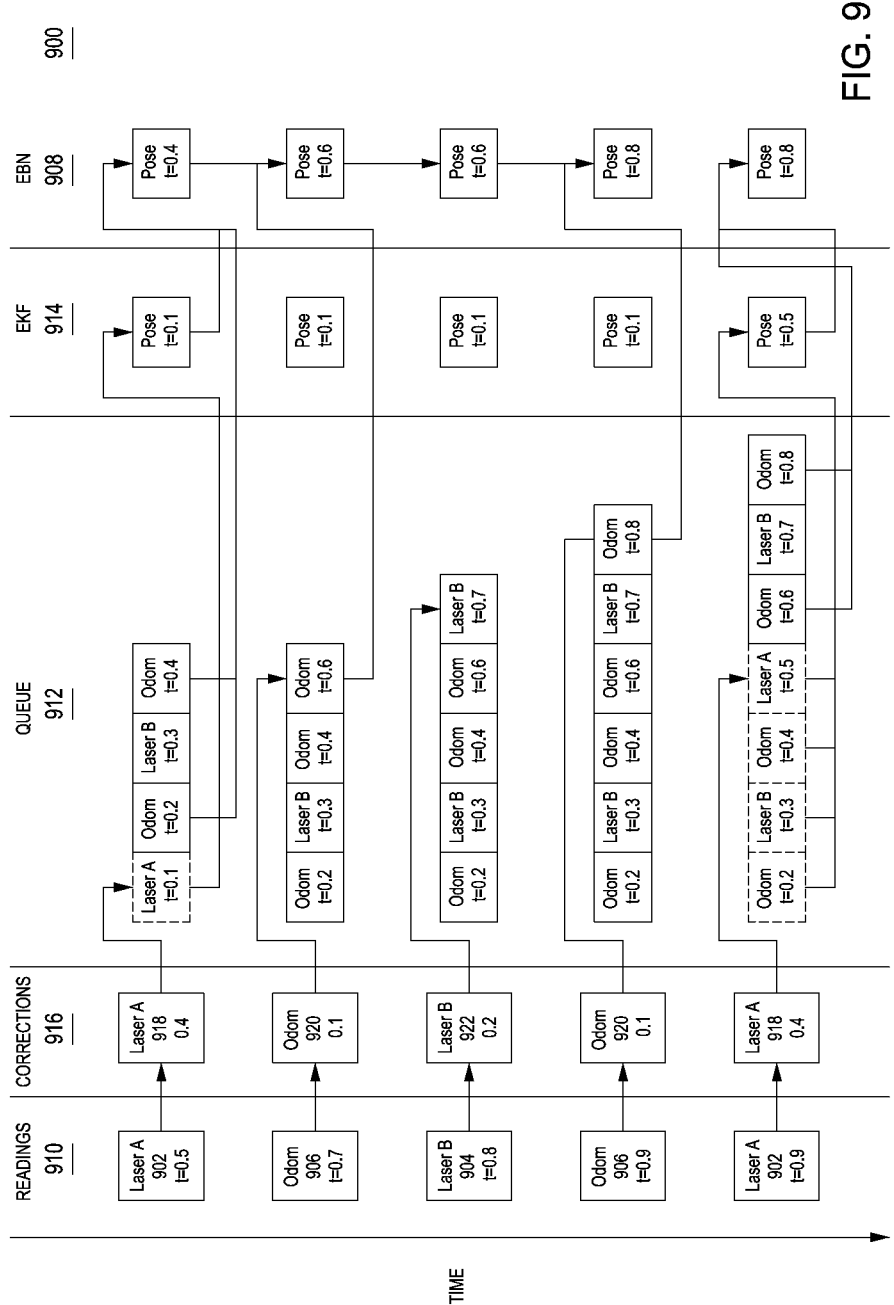
FIG. 9 illustrates a portion of the sensor input message processing according to one or more embodiments.

FIG. 9 illustrates a portion of the sensor input message processing 900 according to one or more embodiments. Specifically, the portion of the sensor input message processing 900 corresponds with the reception time ($T_{902}$) and a time correction ($C_{918}$) of the laser scanner 902. Readings 910 from various sensor devices are processed, corrected, and stored in a queue 912 as sensor input messages in which labels designate a source sensor device. Sensor input messages from the laser scanner 902 and the laser scanner 904 include labels "Laser A" and "Laser B", respectively. Similarly, sensor input messages having odometry data are labeled "Odom" to indicate that the odometer 906 is a source. Furthermore, the sensor input messages within the queue 912 are ordered according to acquisition time, not reception time.

A first reading is received at time t=0.5 from the laser scanner 902 and then stored in the queue 912 as a sensor input message according to an acquisition time of t=0.1, implementing the time correction 918 described above. In some embodiments, the queue 912 is rearranged such that the sensor input message is a next message to be processed instead of messages that became available earlier but were acquired at the sensor device later than the first reading. In some embodiments, an EKF 914 uses the odometry data that is stored in sensor input messages having an earlier acquisition time to determine a position prediction for time t=0.1. Because the laser scanner 902 is a trigger data source, the sensor input message is a trigger message causing the EKF 914 to update the position prediction and determine a historical position. Odometry data that is stored in the queue 912 after the trigger message is fused and used to predict a current position at time t=0.4 in view of the historical position.

The odometer 906 publishes a second reading of odometry data at time t=0.7 and corrected with an odometry acquisition delay 920 to given an acquisition time of t=0.6. As soon as the second reading becomes available to the EBN 908 as a sensor input message, the EKF 914 predicts a vehicle position at time t=0.6. Then, the EBN 908 stores the sensor input message associated with the third reading at the end of the queue 912. Next, a third reading from the laser scanner 904 arrives at the EBN 908 and stored in the queue 912 according to acquisition time using the acquisition delay 922. The third reading is not processed because the laser scanner 904 is a not a trigger data source. Subsequently, a fourth reading from the odometer 906 is received, corrected, and used to estimate a vehicle position at time t=0.8. The EBN 908 integrates odometry data associated with the fourth reading with the odometry data associated with the second reading.

Finally, a fifth reading from the laser scanner 902 is processed and stored as a sensor input message in the queue 912 according to the acquisition time. Because the fifth reading has an acquisition time t=0.5, the sensor input message is inserted at a position before messages having a later acquisition time (i.e., from time t=0.6 to 0.8) and after messages having a prior acquisition time (i.e., from time t=0.1 to 0.4). Since the sensor input message is a trigger message, sensor data from the messages having the prior acquisition time is combined with laser scanner data associated with the fifth reading.

Then, the laser scanner data is used to determine position measurements for time t=0.5 for updating the vehicle state for time t=0.1, which includes a last known vehicle state. Using odometry data from the fourth reading, the EKF 914 corrects a position prediction for time t=0.4 that is based on the last known vehicle state according to some embodiments. Lastly, the EBN 908 uses the messages having the later acquisition time to forward predict a current vehicle position at time t=0.8. In some embodiments, the EBN 908 fuses odometry data stored within these messages and integrates the fused odometry data into the current vehicle position prediction.

Figure 10:
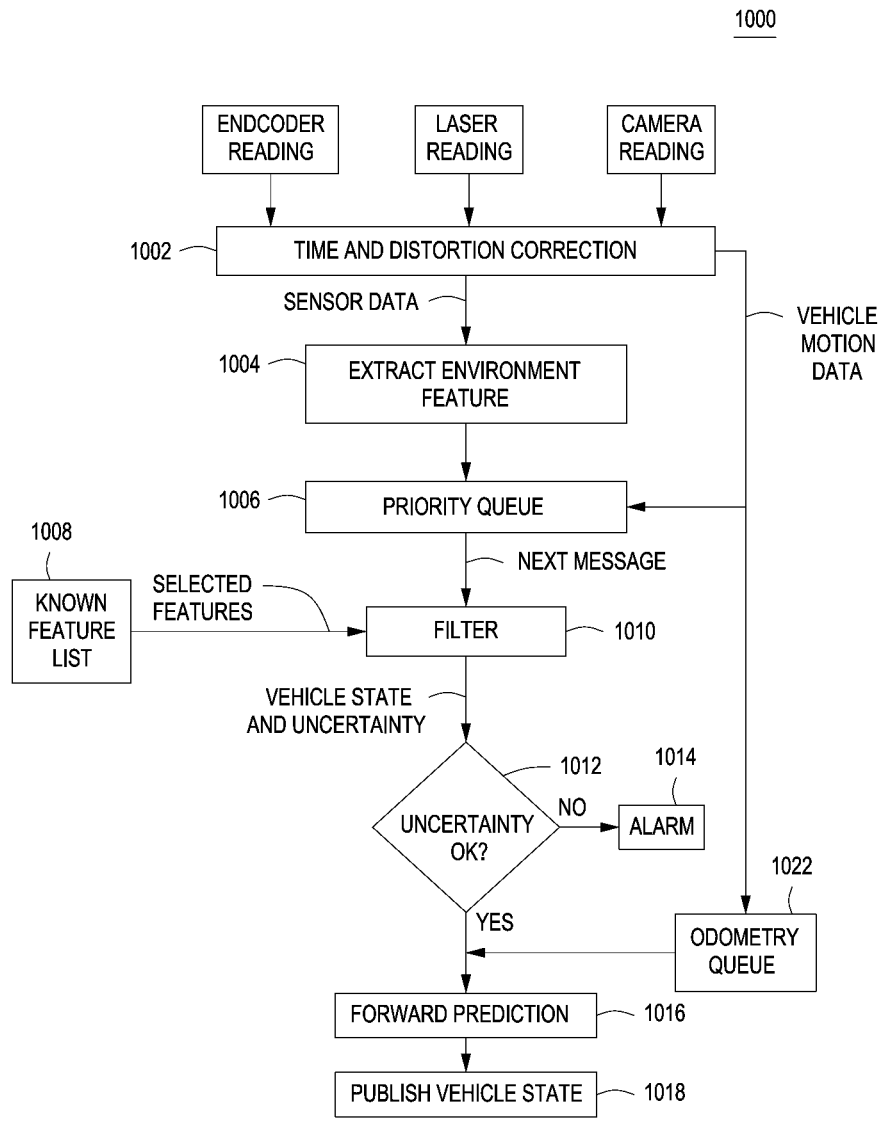
FIG. 10 is a functional block diagram illustrating a localization and mapping system for localizing an industrial vehicle within a physical environment according to one or more embodiments.

FIG. 10 is a functional block diagram illustrating a localization and mapping system 1000 for localizing an industrial vehicle within a physical environment according to one or more embodiments. A plurality of sensor devices, such as planar laser scanner devices, provides information regarding environmental features. Readings from some of the plurality of sensor devices, such as odometers and/or IMUS, provide a vehicle motion data describing relative change in various data, such as position, velocity, acceleration and/or other vehicle motion data.

As various sensor data is communicated, a time and motion distortion correction process 1002 may remove any calculated error in time or from distortion due to motion, instruct a process 1004 to extract environment features from corrected sensor data, such as planar laser scanner data, and store the ordered sensor data in a priority queue 1006 according to some embodiments. The extract environment feature process 1004 examines the ordered sensor data and identifies standard environment features, which are compared to a known feature list 1008, comprising known static and/or dynamic environment features, in filter 1010 to determine vehicle position. The extract environment feature process 1004 determines information regarding these environment features, such as a line, corner, arc, or marker, which are provided in a standard format for use in a filter 1010. Using the ordered sensor data, the filter 1010 updates a current position prediction for the industrial vehicle based on the observed extracted environmental features as explained further below.

In some embodiments, the time and motion distortion correction process 1002 also uses vehicle motion data that corresponds with a laser scan to correct resulting laser scanner data (e.g., range and bearing to measured points) in view of inaccuracies caused by motion artifacts. For example, based on a velocity parameter that is measured at or near (e.g., immediately after or before) an acquisition time of the laser scanner data, the time and motion correction distortion process 1002 adjusts observations regarding the environmental features.

Generally, the filter 1010 provides real time positioning information for an automated type of the industrial vehicle or a manually driven vehicle. The filter 1010 may also provide data indicating uncertainty associated with vehicle position measurements. Thus, should the industrial vehicle temporarily travel in an empty space without available environmental features or markers, the filter 1010 continues to provide accurate localization by updating the vehicle position using vehicle motion data along with determining indicia of uncertainty. The filter 1010 extracts a next sensor input message from the priority queue (e.g., a message having an earliest acquisition time) and examines information regarding the extracted standard environment features. The known feature list 1008 includes static and/or dynamic environment features associated with a map of a physical environment. The filter 810 compares selected features from the known feature list 1008 with the extracted standard features in order to estimate vehicle position.

Depending on safety requirements, the industrial vehicle may operate within a defined degree of uncertainty with respect to a vehicle state before an error triggers an alarm 1014. If a process 1012 determines that the uncertainty exceeds a predefined threshold, the alarm 1014 communicates an error message to a computer, such as a mobile computer coupled to the industrial vehicle or a central computer for monitoring a physical environment. If, on the other hand, the process 1012 determines that the uncertainty exceeds the predefined threshold, a forward prediction process 1016 estimates a current vehicle state as explained further below and a publish vehicle state process 1018 updates the published vehicle state.

During the time and motion distortion correction process 1002, readings (i.e., observations) are transmitted from each sensor device. These readings may be provided by a planar laser and/or three-dimensional laser and/or camera or any other type of sensor device for extracting environment features. The time and motion distortion correction process 1002 also corrects for any distortion that may be due to finite measurement time and/or speed of travel of the industrial vehicle. This distortion occurs as the industrial vehicle and sensors are moving (e.g., during a scan), which associates a temporal characteristic with data extracted from the readings.

In some embodiments, the vehicle state includes a position (x, y coordinates and orientation) associated with the vehicle location in the map. In some embodiments, the vehicle state includes various velocity measurements. The odometry data provides a linear velocity and a rotational velocity. The linear velocity refers to an average linear velocity of the wheels upon which encoder or other velocity measurement devices are installed. The rotational velocity is proportional to the difference between linear velocities of opposing wheels and indicates how much the heading of the vehicle has changed with respect to the global coordinate system. The filter 1010 corrects process noise (e.g., odometry noise such as wheel slip and angular slip) by comparing the modeled motion process noise with noise from environmental observations (eg. observations from a planar laser range measurement) and statistically determines a more accurate position estimation.

Because the filter 1010 processes the sensor input messages according to acquisition time, the filter 1010 may update a vehicle state to include a vehicle position at a point in time that is prior to a current time. As mentioned above, the filter 1010 updates the vehicle state in response to a trigger message. The updated vehicle state may be referred to as a historical vehicle state. After updating the vehicle state, the forward prediction process 1016 uses odometry data, from the odometry queue 1022, corresponding with a time after an acquisition time of the trigger message to further update the historical vehicle state to include a current vehicle position by integrating the odometry data according to some optional embodiments. Prior to the forward prediction process 1016, sensor input messages from the odometers are communicated to an odometry queue 1022 according to some embodiments. The odometry data may be used to execute the forward prediction process 1016.

The filter 1010 may cause extracted environment features 1004 that do not appear in the known feature list 1008 to be added to, or in the case of negative observation, removed from a list of known dynamic environment features associated with a map, such as the map 406 in FIG. 4, which will then be used as part of the known feature list 1008 the next time the known feature list 1008 is accessed.

Figure 11:
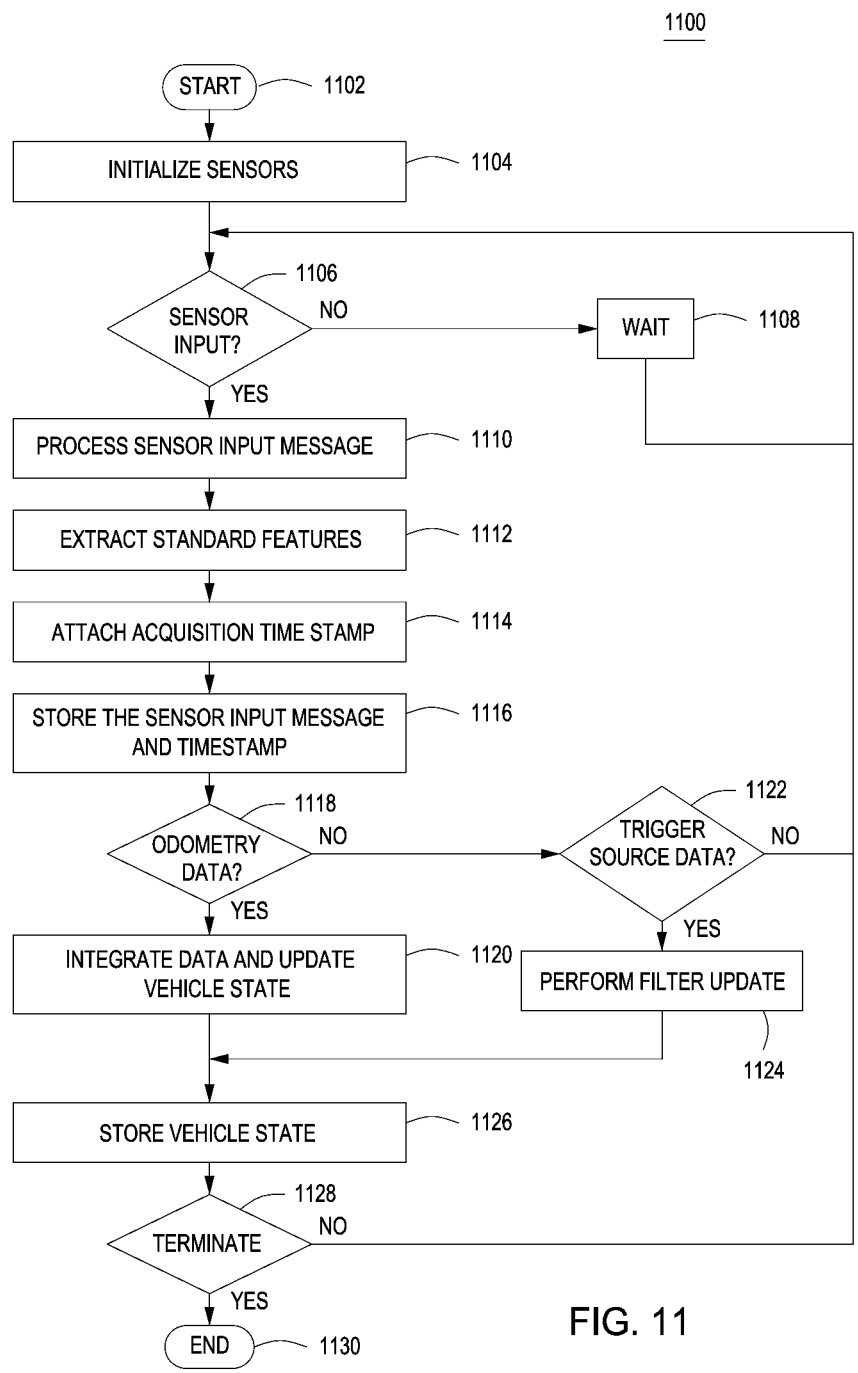
FIG. 11 is a flow diagram of a method for providing accurate localization for an industrial vehicle according to one or more embodiments.

FIG. 11 is a flow diagram of a method 1100 for providing accurate localization for an industrial vehicle according to one or more embodiments. In some embodiments, an environment based navigation module (e.g., the environment based navigation module 420 of FIG. 4) performs each and every step of the method 1100. In other embodiments, some steps are omitted or skipped. The method 1100 starts at step 1102 and proceeds to step 1104.

At step 1104, the method 1100 initializes various sensor devices. For example, the method 1100 initializes one or more planar laser scanners and/or cameras, and/or odometers, and/or the like. At step 1106, the method 1100 determines whether any of the sensor devices communicated a sensor input message. If sensor input is received from one of the sensor devices, the method 1100 proceeds to step 1110. Otherwise, at step 1108, the method 1100 waits for a broadcast of a sensor input message. Once the sensor input message becomes available (e.g., to an environment based navigation module), the method 1100 proceeds to step 1110.

At step 1110, the method 1100 processes the sensor input message. At step 1112, the method 1100 extracts standard features (i.e., environmental features) from the sensor input message. At step 1114, the method 1100 attaches an acquisition time stamp to the sensor input message.

At step 1116, the method 1100 stores the sensor input message in the priority queue. The method 1100 rearranges sensor input messages within the priority queue according to acquisition time instead of reception time. The acquisition time, hence, for each sensor input message constitutes a priority (i.e., a value) that is used for ordering the sensor input messages. The method 1100 determines position measurements in response to the acquisition time associated with each sensor input message by examining a next sensor input message in the priority queue having an earliest acquisition time. In some embodiments, the method 1100 corrects a position prediction based on the position measurements that are observed by the sensor devices.

At step 1118, the method 1100 determines whether a next queue entry within the priority queue includes odometry data. If the queue entry is odometry data, the method 1100 proceeds to step 1120. At step 1120, the method 1100 integrates the odometry data within the priority queue and updates a vehicle position. If, on the other hand, the next queue entry measurement does not include the odometry data, the method 1100 proceeds to step 1122. At step 1122, the method 1100 determines whether the sensor input message was generated and communicated by a trigger data source. If the sensor input message is from the trigger data source, the method 1100 proceeds to step 1124. If, on the other hand, the sensor input message is not from the trigger data source, the method 1100 returns to step 1106. At step 1124, the method 1100 performs a filter update process in order to determine accurate position measurements and update a vehicle state. In some embodiments, the method 1100 corrects a position prediction that is determined using the sensor data and a previous vehicle state.

At step 1126, the method 1100 stores corrected vehicle position in vehicle state information (e.g., the vehicle state information 318 of FIG. 3). At step 1128, the method 1100 determines whether to terminate the localization process. If the localization process is to be terminated, the method 1100 proceeds to step 1130. If the localization process is not to be terminated, the method 1100 returns to step 1106. At step 1130, the method 1100 ends.

Figure 12:
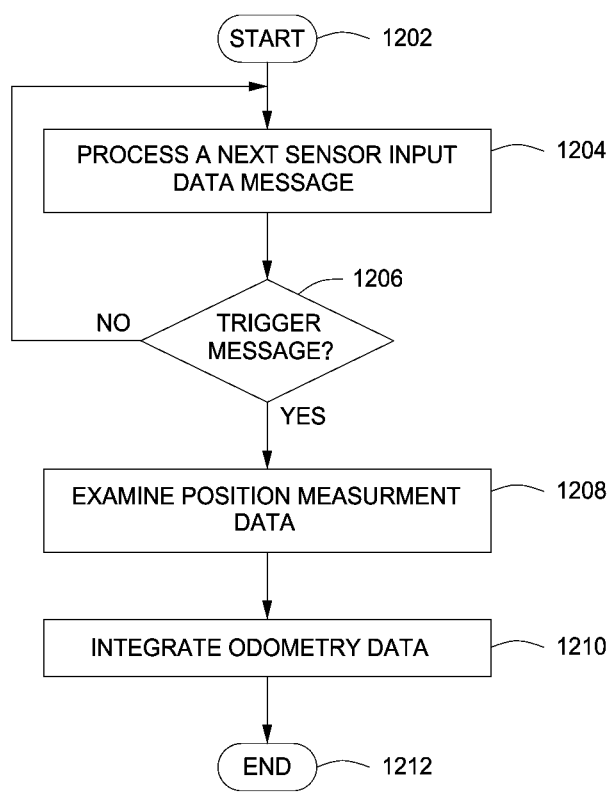
FIG. 12 is a flow diagram of a method for updating a vehicle state for an industrial vehicle using a filter according to one or more embodiments.

FIG. 12 is a flow diagram of a method 1200 for updating a vehicle state for an industrial vehicle using a filter according to one or more embodiments. In some embodiments, an environment based navigation module performs each and every step of the method 1200. In other embodiments, some steps are omitted or skipped. In some embodiments, the method 1200 implements step 924 of the method 1100 as illustrated by FIG. 11. Accordingly, the method 1200 is executed when a sensor input message from a trigger data source (i.e., a trigger message) is received or becomes available. Prior to performing the filter update process for the vehicle state, a filter (e.g., a process filter, such as an Extended Kalman Filter) determines a current position prediction based on a previous vehicle state (e.g., previous vehicle position). The method 1200 starts at step 1202 and proceeds to step 1204.

At step 1204, the method 1200 processes a next sensor input message. In some embodiments, the method 1200 extracts the next sensor input message from a queue (e.g., a priority queue ordered by acquisition time). In some embodiments, the method 1200 examines the next sensor input message having an earliest acquisition time and extracts information regarding standard static and/or dynamic environmental features from laser scanner data. The method 1200 also integrates any available odometry data and predicts a current vehicle position. It is appreciated that the method 1200 generates additional information regarding the environmental features from other sensor devices, such as encoders, according to some embodiments.

At step 1206, the method 1200 determines whether the next sensor input message is the trigger message. As explained in the present disclosure, the trigger message is communicated by the trigger data source (e.g., a particular sensor device) according to some embodiments. If the next sensor input message is also the trigger message, the method 1200 proceeds to step 1208 at which position measurement data associated with the next sensor input message is examined. In some embodiments, the method 1200 updates a position prediction using laser scanner data and odometry data that was acquired prior to and including the trigger message.

At step 1210, the method 1200 integrates remaining odometry data into predicting a current position given recent vehicle movement and updating the vehicle state (e.g., the vehicle state information 318 of FIG. 3). The step 1210 may be referred to as a forward prediction process in the present disclosure. If the sensor input message is not the trigger message, the method 1200 returns to step 1204 and extracts another sensor input message from the queue in order of acquisition time. At step 1212, the method 1200 ends.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

What is claimed is:

1. A method of operating an industrial vehicle in a physical environment, wherein:
the industrial vehicle comprises a mobile computer and a plurality of sensor devices;
the plurality of sensor devices comprise a wheel encoder, an IMU, or both, and one or more two-dimensional laser scanners;
the wheel encoder, IMU, or both, provide odometry data of the industrial vehicle;
the two-dimensional laser scanner provides details of the physical environment;
the mobile computer comprises an EBN module that employs a priority queue that receives input messages from the plurality of sensor devices and associates each input message with a data source and an acquisition time stamp;
the plurality of sensor devices have different sampling periods and different sampling delays so that an order in which sensor data from the plurality of sensor devices is acquired is not the same as an order in which the sensor data becomes available to the EBN module;
the industrial vehicle is moved along a vehicle path by utilizing an Extended Kalman Filter of the mobile computer to model the position of the industrial vehicle in a two-dimensional plane as a probability density, use the odometry data to update a predicted position of the industrial vehicle, and correct for error in the predicted position of the industrial vehicle using environmental features extracted from the two-dimensional laser scanner by comparing the extracted environmental features with a known map of the physical environment;
the predicted vehicle position update by the Extended Kalman Filter is delayed until a trigger message initiating the vehicle position update is received by the EBN module; and
the EBN module processes the input messages in the priority queue in the order of acquisition time upon availability of the trigger message.

2. A method as claimed in claim 1 wherein the trigger message is generated when a dead reckoning error associated with the odometry data exceeds a pre-defined threshold.

3. A method as claimed in claim 1 wherein the trigger message is generated when the priority queue exceeds a certain length.

4. A method as claimed in claim 1 wherein the predicted vehicle position update by the Extended Kalman Filter is delayed an amount of time that is sufficient to ensure that none of the input messages are processed out of order of acquisition time.

5. A method as claimed in claim 1 wherein:
one of the plurality of sensors devices has a longest sampling delay; and
the predicted vehicle position update by the Extended Kalman Filter is delayed until an input message is received from the sensor device having the longest sampling delay.

6. A method as claimed in claim 1 wherein the EBN module deletes one or more of the input messages from the priority queue when a current vehicle position estimate has a high confidence.

7. A method as claimed in claim 1 wherein the EBN module deletes one or more of the input messages from the priority queue to reduce resource workloads.

8. A method as claimed in claim 1 wherein the trigger message initiating the vehicle position update is received from one of the two-dimensional laser scanners.

9. A method as claimed in claim 1 wherein successive input messages in the priority queue are:
integrated, used to update vehicle state, and made available for processing upon receipt of a trigger message, if the input message is odometry data;
used to initiate the predicted vehicle position update, if the input message is a trigger message; and
stored in the priority queue with one or more successive input messages without updating the vehicle state or initiating the predicted vehicle position update, if the input message is not odometry data or a trigger message.

10. A method as claimed in claim 1 wherein, prior to processing the input messages in the priority queue, the EBN module rearranges the input messages according to the associated acquisition time stamp using a data source delay associated with each input message.

11. A method as claimed in claim 10 wherein the data source delay comprises an internal system delay associated with a particular sensor device.

12. A method as claimed in claim 10 wherein the data source delay comprises a characteristic measurement delay associated with a particular data source.

13. A method as claimed in claim 1 wherein the known map of the physical environment comprises known environmental features.

14. A method as claimed in claim 1 wherein the known map of the physical environment comprises a list of dynamic environmental features.

15. A method as claimed in claim 1 wherein the EBN updates the predicted position of the industrial vehicle by integrating the odometry data over time.

16. A method of operating an industrial vehicle in a physical environment, wherein:
the industrial vehicle comprises a mobile computer and a plurality of sensor devices;

the plurality of sensor devices comprise a wheel encoder, an IMU, or both, and a plurality of two-dimensional laser scanners;

the wheel encoder, IMU, or both, provide odometry data of the industrial vehicle;

the two-dimensional laser scanners provide details of the physical environment and are mounted at different measurable positions on the industrial vehicle;

the mobile computer comprises an EBN module that transposes laser scan data from the two-dimensional laser scanners to a common reference frame and combines the transposed laser scan data into a single, virtual laser scan; and the EBN module utilizes the single, virtual laser scan to control movement of the industrial vehicle along a vehicle path.

17. A method of operating an industrial vehicle in a physical environment, wherein:

the industrial vehicle comprises a mobile computer and a plurality of sensor devices;

the plurality of sensor devices comprise a wheel encoder, an IMU, or both, for providing odometry data of the industrial vehicle;

at least one additional sensor device provides details of the physical environment;

the mobile computer comprises an EBN module that employs a priority queue that receives input messages from the plurality of sensor devices and associates each input message with a data source and an acquisition time stamp;

the plurality of sensor devices have different sampling periods and different sampling delays so that an order in which sensor data from the plurality of sensor devices is acquired is not the same as an order in which the sensor data becomes available to the EBN module;

the industrial vehicle is moved along a vehicle path by utilizing an Extended Kalman Filter of the mobile computer to model the position of the industrial vehicle in a two-dimensional plane as a probability density, use the odometry data to update a predicted position of the industrial vehicle, and correct for error in the predicted position of the industrial vehicle using environmental features extracted from the additional sensor device by comparing the extracted environmental features with a known map of the physical environment;

the predicted vehicle position update by the Extended Kalman Filter is delayed until a trigger message initiating the vehicle position update is received by the EBN module; and the EBN module processes the input messages in the priority queue in the order of acquisition time upon availability of the trigger message.

* * * * *